United States Patent [19]

Kafafian

[11] 3,781,802
[45] Dec. 25, 1973

[54] METHOD OF COMMUNICATION AND/OR TESTING OF THE HANDICAPPED

[76] Inventor: Haig Kafafian, 4201 Cathedral Ave., N.W., Washington, D.C.

[22] Filed: Mar. 27, 1972

[21] Appl. No.: 238,319

[52] U.S. Cl. ........................ 340/147 R, 340/166 R
[51] Int. Cl. ............................................ B41j 5/10
[58] Field of Search ..................... 340/365 R, 147 R

[56] References Cited
UNITED STATES PATENTS

| | | | |
|---|---|---|---|
| 3,220,000 | 11/1965 | Lesage | 340/365 R |
| 3,491,355 | 1/1970 | Harrold | 340/365 R |
| 3,226,712 | 12/1965 | Lens et al. | 340/365 R |
| 3,507,376 | 4/1970 | Kafafian | 179/19 R |

*Primary Examiner*—Harold I. Pitts
*Attorney*—Leo A. Rosetta et al.

[57] ABSTRACT

Three different classes of interface means are connectable to a dual-input matrix or converter, which in turn will operate a device for purposes of communication and/or indicate student capabilities.

A unique combination of designators is established for every function in a multiplicity of functions. A device is provided to print, display or perform the function. A matrix or other means transmits signals to the printing or displaying device commensurate with the unique combination of designators selected. Three classes of interfaces are selectively connected to the matrix, one having two sets of input switching means of seven keys each, another having one set of seven keys, and a third having a single input transducer. By use of the same unique designators with each class of interface, an individual will be able to print or display the very same function, regardless of the class of interface used.

16 Claims, 6 Drawing Figures

METHOD OF COMMUNICATION AND/OR TESTING OF THE HANDICAPPED

BACKGROUND AND OBJECTS

The present invention relates to a method of communication adapted for use by physically and/or neurologically impaired individuals. Also, the invention relates to a method of testing the capability of such individuals.

More particularly, the invention relates to a method for coordinating the use of devices illustrated in my previous U.S. Pat. No. 3,507,376, issued Apr. 21, 1970 on a Communication System for the Handicapped, together with my patent applications, Ser. No. 220,995, filed Jan. 26, 1972, and Ser. No. 229,089, filed Feb. 24, 1972.

As will be apparent from the discussion set out herein, my invention focuses its attention toward establishing dialogue for people who cannot communicate in an ordinary manner and improving communication by and education of disabled persons possessing cognitive abilities and language comprehension through a unique family of man-machine communications systems. One thesis upon which this invention is based is that information acted upon by living and non-living systems has significance to the user, whether man or automata, only when there is linguistic commonality, meaning and understanding of the information together with a medium with sufficient bandwidth capability and signal/noise ratio to permit transport of the information in a predetermined code, knowledgeable to sender and receiver alike. A further premise is that information interacting in a goal-oriented cybernetic system yields, by virtue of its stability, entropy, and other characteristics, positive and negative feedback. When the feedback is properly programmed, governed and adapted through appropriate transfer functions and matched interfaces coupled to the human controller and his automata, extensions to the boundaries of the system's original goals are achieved in a manner enhancing that system's purposeful behavioral objectives and usefulness to the human controller in society.

There are many individuals, particularly children, in our society who because of multiple disabilities, are literally wasting away and are needlessly a burden on society. The instant invention has been found to have significant effect in improving the communication ability of individuals having disabilities which can normally be classified into the following four broad categories:

1. Those with an inability to communicate in any effective written form due to severe physical and/or neurological dysfunctions.

2. Those who are deaf and/or have speech impairments which preclude the establishment and maintenance of "live" communications beyond tactile or visual range.

3. Those who are blind or have visual impairments with an inability to learn to use braille because of its ambiguity or physical inability, i.e., loss of fingers, to use "HAIBRL" as disclosed in my patent application, Ser. No. 117,544, filed Feb. 19, 1971.

4. Those with multiple impairments, including "learning disabilities," which in some cases involve the absence of written language comprehension and knowledge of language structure, the possession of minimal motor control capability and sufficient cognitive and sensory abilities to understand, respond to, and carry on dialogue via drawings or pictures and/or spoken or prerecorded audio messages.

It has therefore been my purpose to develop a man/machine language based on a common dual-input code used for programming electric writing and other machines. The property of the commonality of the code is of enormous value to the teacher and the handicapped student. I use a common dual-input coding which permits the exchange of interfaces or keyboards, especially where matching and coupling of another style interface to the specific performance capabilities of each individual may become necessary. A common programming code also eliminates the necessity for the teacher to learn a "new" typing procedure for each student who uses a different style keyboard. If a specific interface used by a handicapped person has to be exchanged for a new one more suited to the requirements of that person's capability, the individual is not compelled to learn a new code. The types of interfaces utilized in my system are described in the previously mentioned patent and applications. They will be further discussed below in relation to the present method. Broadly speaking, some of the interfaces which may be used fall in several different categories, as follows:

1. A bilaterally controlled single or two section dual-input interface, with two groups of keys or controls which may be mounted on the user's body, a desk, a table, or other structure, e.g., the arms of a wheelchair.

2. A unilaterally controlled dual-input interface accessible to a single portion of the user's body such as the user's arm, tongue, or any other such portion of the body which can be controlled.

3. A "keyless" typewriter or machine keyboard with a dual-input interface consisting of a lever or levers or "joysticks." These interfaces are for use by blind or visually impaired individuals who find it difficult to locate a position, but who can easily establish orthoganal references and differentiate displacements from a fixed reference from which keying positions are related. They are also for persons with cerebral palsy, muscular dystrophy, or other such debilitating conditions, and for persons who cannot effectively operate or manipulate regular typewriter keys, but whose body movements permit operation of lever mechanisms. 4. A dual-input finger, foot, or fist-operated interface consisting of various combinations of sizes of keys or levers depending upon the user's capability and needs.

5. A conductive surface interface used in conjunction with contacts on the fingers or gloves, control being initiated by touching the finger or glove contacts to the conductive plate.

6. A glove interface with keying means built into the gloves where dual-input control is accomplished by touching appropirate finger contacts with other parts of the glove, body or structure.

7. A combined tongue and body operated dual-input keyboard.

8. A single input transducer interface requiring sequential operations by the tongue or any other part of the body or from signals generated by muscles or the central nervous system to effect operation of the system.

The need for an entirely new input interface, as opposed to an ordinary electric typewriter, should be apparent since physically handicapped children and children with neurological dysfunctions often do not possess the muscular coordination and dexterity necessary to communicate in written form, either by handwriting or by operating for example the 49 keys of an electric typewriter. These handicaps, especially when accompanied by language impairments and specific learning disabilities, severely impede further development of intellectual and verbal potentialities. As a result, many multiple handicapped individuals, especially children who potentially have the intellectual competence to become self-sufficient contributing members of society, are institutionalized because their motor capabilities appear too limited for independent and practical functioning.

In spite of the apparent hopelessness of many children and adults with multiple handicaps, it has been demonstrated that it is often possible to employ "CYBERTYPE" and "CYBERCOM" (Service marks of CYBER CORP.) systems which permit use of the individual's remaining motor capabilities. Thus, with the development of my family of man-machine systems, such children and adults have been found to be able to more effectively communicate.

Specifically, the three classes of interfaces which will be considered herein include the 14-key interface described in my original U.S. Pat. No. 3,507,376 consisting of two groups of seven keys each. The 14-key keyboard is electrically connected, for example, to an electric typewriter which provides a printed output. Each letter, symbol or function to be produced is assigned to a pair of interface keys of the portable "Cybertype" keyboard, one key being in each of the two banks. In this configuration of the dual-input interface, two keys are operated together using a finger of the right hand and a finger of the left hand. It has been found that many students who lack the manual coordination and dexterity necessary to strike individual keys on the 49-key interface of an orindary typewriter, can, with little difficulty, strike pairs of keys on the 14-key, dual-input interface, using one finger of each hand, prostheses, or other parts of the body when larger keys on the portable keyboards are used. The readily accessible area to be covered, the minimum number of keys on the interface, the approximate sized key-tops and spacing of keys, the use of learning the dual-input code, and the minimum coordination required, bilaterally or unilaterally, are all factors which may contribute to the ease with which my system can be operated by individuals who are physically and/or neurologically disabled, but who have sufficient cognitive and sensory capabilities.

Another class of interface includes only seven keys of the type described above, wherein one of the seven keys is actuated to provide, for example, the function of the right hand, and then one of the same seven keys is subsequently actuated to provide the equivalent of the left hand output.

A third class of interface in the "CYBERCOM" family of man-machine systems includes only one input transducer whereby appropriate multiple actuating of the single transducer follows the dual-input coding will yield the very same output achieved from each of the above two systems. The dual-input code for each letter or function on the typewriter, for example, is assigned a unique pair of input signals. Although various studies have revealted slight differences in letter frequencies, my code is based on the following order of letters from most frequently to least frequently used:

E T A O N I R S H D C L M U F P Y B G W V J K Q Z X

The letters contained in each language have their own statistical frequency of occurrence. The above frequency usage is for the English language alphabet for which I have developed what I call an EPSILONTAU chart. The letters or symbols of each language, of course, will have its own frequency distribution or EPSILONTAU. In order to be accurate, the "space" function on a typewriter will appear initially in the chart since it is most frequently used in typing. This chart will be referred to in the detailed description of the invention discussed relative to specific input interfaces.

SUMMARY OF THE INVENTION

The invention includes three different classes of interface means having dual outputs for connection, for example, to a dual-input matrix or converter, which in turn will operate a device for communication and/or control such as an office machine, typewriter or the like, a display, a punched or magnetic or storage device, as well as almost any material where data or information is to be stored, printed, displayed, or otherwise used.

Alternatively, the output can be a light diaplay or any of the above for the purpose of testing the capabilities of an individual. The diaplay, when in the form of a visual output, can immediately advise the student and teacher wheter or not the correct function has been actuated. When in the form of a tape, printed letter or the like, a permannet record will be provided for the recordation of the test score.

Specifically, the invention includes a method of communication and/or a method of testing which includes:

1. A unique combination of designators is established for every function in a multiplicity of functions, for example, a letter, symbol or function appearing on a typewriter.

2. An electrical, electrostatic, electrochemical device or the like is provided to print or display a letter on a typewriter, light a bulb behind a letter or other display means.

3. A matrix or other means is provided for transmitting signals to the typewriter or display commensurate with the unique combination of designators selected.

4. Connected to the matrix is a first device having at least two sets of input switching means, each set having for example, seven input switches or keys. Each of the switches in one set is connected to an X or row input of the matrix, while each of the other set is connected to a Y or column input of the matrix, whereby upon the simultaneous actuation of a combination of a switch from both of the sets, a dual-output signal will be fed into the matrix, which in turn will provide a signal, yeilding a typewriter function, typing a letter or symbol on a typewriter, lighting a lamp display or the like or providing a signal for storage.

5. Alternatively, if in the case of a patient whose condition is weakening, it being desired to change from a bilateral system to a unilateral system, a device with seven input switches or keys can be utilized. The seven input device would replace the 7 × 7 or 14-key input system. Also, in the case of a testing operation, if it were found that the operation of a 14-key device could be improved, then the seven-key device would be connected and matched to the human controller. Each of the seven switches in the newly connected device is connectable to a row and a column. With appropriate logic means, a first actuation of an input switch will provide the row designation to the matrix, while a subsequent actuation will provide the column designation.

Finally, upon further weakening of the patient, or if it is found that the student being tested does not perform sufficiently well on a seven-input interface, an interface with a single input transducer may be substituted with no necessity for the student to learn a new programming code. By appropriate multiple actuations of the single transducer, the appropriate row and column designations will be obtained using the very same dual-input coding used for the preceeding seven- or 14-key interfaces.

One example of the 7 X 7 or 14-key interface is found in my U.S. Pat. No. 3,507,376 wherein each of a first set of keys is connected to the row of a relay and diode matrix, while the other set is connected to the column of the matrix. When the operator presses one key in each of the sets, the appropriate solenoid in the matrix will be actuated, thus causing the typing of the letter, symbol or function desired or lighting the light or providing other output means.

In the seven-key embodiment, the dual sequential momentary actuation of any two of the seven interface key-operated coding switches, which may include a repeat actuation of the very same switch, will produce an output from the controller. A signal resulting from the actuation of the first interface switch of the sequentially operated pair is time delayed or stored, and is the X-coordinate of the matrix. When the second switch is actuated, a Y-coordinate signal of the matrix and the X-coordinate signal retrieved from storage are provided as outputs from the logic system. Upon release of the second switch of the actuated pair, the logic circuitry is reset, the memory is cleared and the logic box is ready to accept another sequentially paired input.

The single-key system has what may be termed "Hold" and "No-Hold" embodiments. The "Hold" embodiment of the invention includes a single input transducer. Connected between the input transducer and the output matrix are a plurality of logic elements, pulse-generating type devices, and two stepping switches. Upon the first actuation of the input switch the row stepping switch will be sequentially stepped through a series of positions until a desired row in the matrix is selected. Upon deactuation of the input switch the column stepping switch will be automatically, sequentially stepped through a second series of positions until a desired column in the matrix is selected. When the desired column of the matrix is reached, thus locating an element in the matrix connected to a particular external device, the input switch is again actuated and a signal will be generated and sent out through the stepping switches, thereby energizing the particular element in the matrix which in turn will, in the case of a typewriter, cause a specific function to be typed. Upon deactuation of the input switch, the stepping switches are restored to their "zero" positions, and the system will be reset to accept the next dual-input of the single input transducer.

In the "No-Hold" embodiment of the invention additional logic elements are added to the "Hold" embodiment wherein it is not necessary to hold the input switch after the first actuation to keep the row switch "stepping." A second actuation of the input switch will stop the row stepping switch and automatically start the column stepping switch. A third actuation of the input switch will stop the column stepping switch and cause an output signal to be generated, thereby producing the desired function of the human controller.

BRIEF DESCRIPTION OF THE DRAWINGS

The novel features and uniqueness of the invention are set forth in the appended claims. The invention itself, both as to construction and method of operation, together with additional objects and advantages thereof will be understood from the following description when read in conjunction with the accompanying drawings wherein:

DETAILED DESCRIPTION OF THE INVENTION

Figure 1:
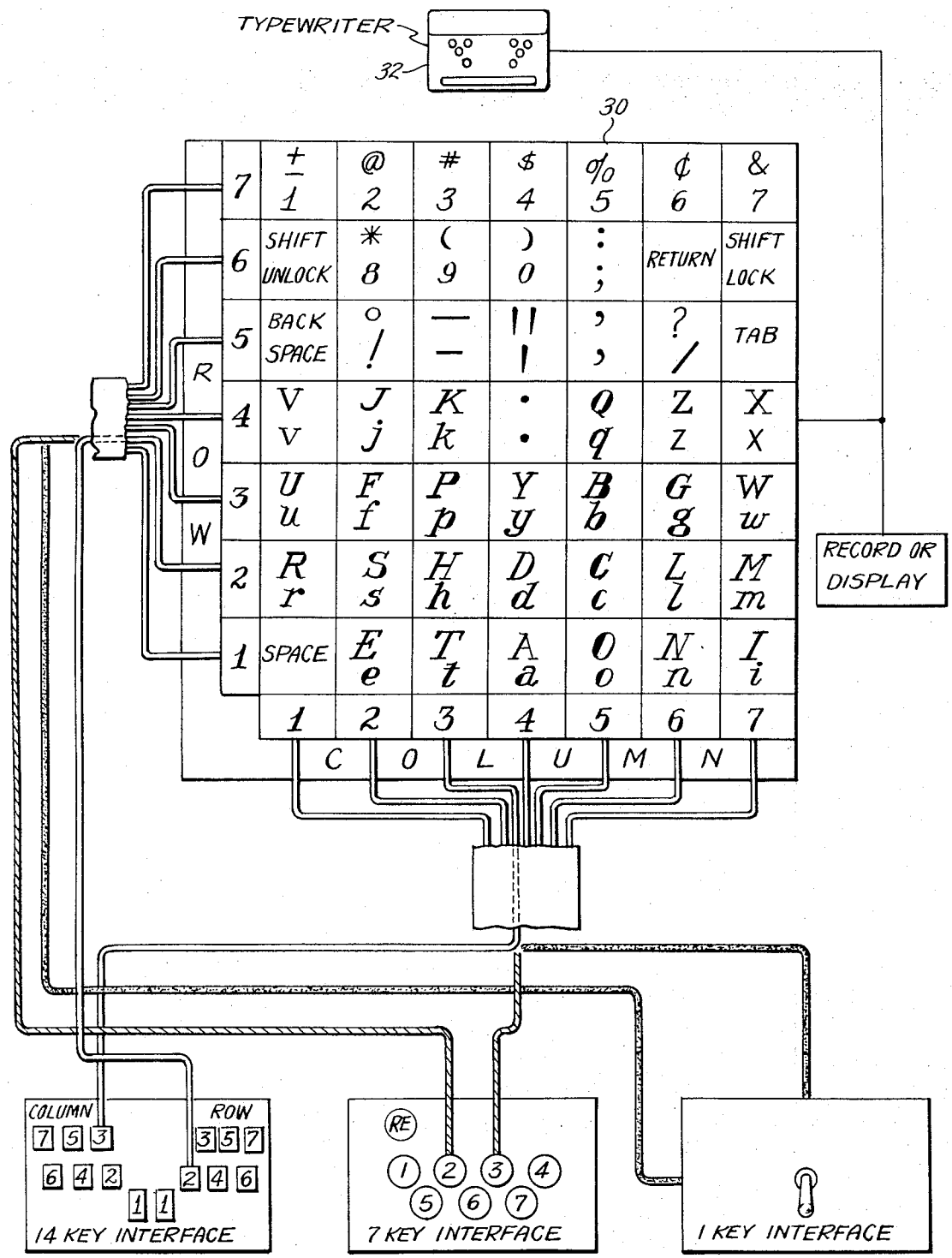
FIG. 1 is a schematic diagram of the overall method when utilized with parallel output devices.

With reference to FIG. 1 there will be seen three interfaces of the classes described below which are selectively connected to a matrix illustrated with an "EPSILONTAU" chart superimposed thereon. The output of the matrix/EPSILONTAU chart is seen going alternatively to a "Cybertype" typewriter or the like or a record/display device.

When utilizing the invention as a method of testing an individual, the 14-key, dual-input interface is first connected to the matrix and output devices. The individual is initially instructed and the operation of the interface is demonstrated; then he is given a series of letters or functions to be typed. For example, as will be discerned in greater detail below, if the letter "H" is to be typed or displayed, the key No. 2 in the rowbank and key No. 3 in the column bank must be actuated simultaneously. If this is done, the letter H will be typed on the typewriter or displayed for visual feedback.

If the student does not perform sufficiently well on the 14-key interface, the seven-key dual-input interface is connected in place thereof. Assuming the very same letter H is to be typed or displayed, key No. 2 is first depressed, and then key No. 3 is depressed. By the appropriate circuitry discussed below, the H will be typed and/or displayed.

Finally, if the seven-key, dual-input interface does not match the remaining motor capabilities of the student, it is disconnected and the one-key, dual-input interface is connected to the system. In the "HOLD" embodiment disclosed, the single key is held actuated for a certain period of time to step the device to the second row and then deactuated by releasing the key. Upon deactuation, the device will begin selecting the appropriate column. When the third column is reached, the interface will be actuated a second time to stop the device at the third column. Upon the second deactuation, the appropriate letter H will be typed and/or displayed.

In another/or "NO-HOLD" embodiment a first actuation of the single key is used to start the row selection, a second actuation to stop it and automatically start the column selection, and a third actuation to stop the column selection and cause the typing and/or display.

The following is a chart of my dual-input "Cybercode" which can be used in conjunction with my "EPSILONTAU" chart:

| "First-key" position | "Second-key" position | Typewriter function and keying codes | |
|---|---|---|---|
| | | Upper case | Lower case |
| 1 | 1 | Space | 1,1 |
| 1 | 2 | E | e | 1,2 |
| 1 | 3 | T | t | 1,3 |
| 1 | 4 | A | a | 1,4 |
| 1 | 5 | O | o | 1,5 |
| 1 | 6 | N | n | 1,6 |
| 1 | 7 | I | i | 1,7 |
| 2 | 1 | R | r | 2,1 |
| 2 | 2 | S | s | 2,2 |
| 2 | 3 | H | h | 2,3 |
| 2 | 4 | D | d | 2,4 |
| 2 | 5 | C | c | 2,5 |
| 2 | 6 | L | l | 2,6 |
| 2 | 7 | M | m | 2,7 |
| 3 | 1 | U | u | 3,1 |
| 3 | 2 | F | f | 3,2 |
| 3 | 3 | P | p | 3,3 |
| 3 | 4 | Y | y | 3,4 |
| 3 | 5 | B | b | 3,5 |
| 3 | 6 | G | g | 3,6 |
| 3 | 7 | W | w | 3,7 |
| 4 | 1 | V | v | 4,1 |
| 4 | 2 | J | j | 4,2 |
| 4 | 3 | K | k | 4,3 |
| 4 | 4 | . Period | . | 4,4 |
| 4 | 5 | Q | q | 4,5 |
| 4 | 6 | Z | z | 4,6 |
| 4 | 7 | X | x | 4,7 |
| 5 | 1 | Back space | | 5,1 |
| 5 | 2 | ° | ! | 5,2 |
| 5 | 3 | " | ' | 5,3 |
| 5 | 4 | | | 5,4 |
| 5 | 5 | , | , | 5,5 |
| 5 | 6 | ? | / | 5,6 |
| 5 | 7 | Tab | | 5,7 |
| 6 | 1 | Shift unlock | | 6,1 |
| 6 | 2 | * | 8 | 6,2 |
| 6 | 3 | ( | 9 | 6,3 |
| 6 | 4 | ) | 0 | 6,4 |
| 6 | 5 | Colon: | Semicolon; | 6,5 |
| 6 | 6 | Carriage return | | 6,6 |
| 6 | 7 | Shift lock | | 6,7 |
| 7 | 1 | + | 1 | 7,1 |
| 7 | 2 | @ | 2 | 7,2 |
| 7 | 3 | # | 3 | 7,3 |
| 7 | 4 | $ | 4 | 7,4 |
| 7 | 5 | % | 5 | 7,5 |
| 7 | 6 | ¢ | 6 | 7,6 |
| 7 | 7 | & | 7 | 7,7 |

14-KEY INTERFACE SYSTEM

Figure 2:
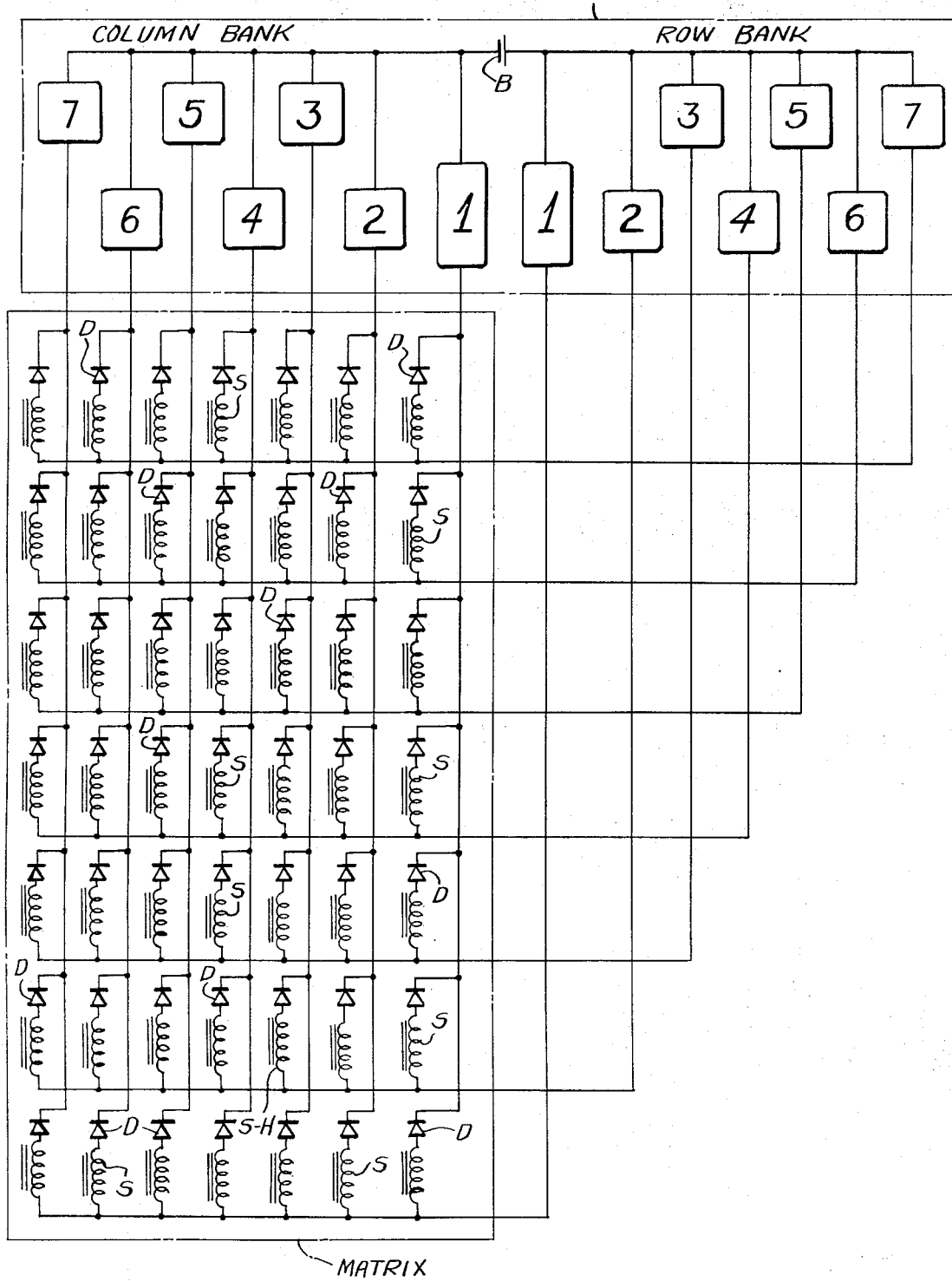
FIG. 2 is a schematic diagram of a 14-key input interface.

Referring now to FIG. 2, a detailed drawing of the portable 14-key interface as connected to the matrix will be seen. This is one embodiment of the system illustrated in my U.S. Pat. No. 3,507,376, wherein 14 key-controlled switches are used to operate a typewriter or other machine. The switches are of the conventional type having two terminals which are bridged by a conductive bar when the key is depressed in order to complete an electrical circuit through the switch. The keys are shown arranged in two groups of seven each, conveniently mounted, upstanding from a keyboard where they may be operated by both hands of an operator. However, it should be noted that the arrangement of the keys is sufficiently compact to be spanned by a single hand of the operator whereby one-handed operation is quite possible. It should also be apparent that the offset orientation of the keys enables their convenient operation by a person wearing prosthetic and/or orthotic/prosthetic devices. In this regard it should be noted that the wearer of artificial arms may have difficulty in maintaining control through a wide angle of movement. Consequently, the rather compact dual input arrangement of 14 keys described above is significantly easier for an armless person to operate with his prosthesis than a conventional typewriter ekyboard where approximately 49 keys are spaced over a large area.

As illustrated in this embodiment, Y inputs to the matrix are controlled by seven left-hand or column keys numbered 1 to 7 and the X inputs by the seven right-hand or row keys also numbered 1 to 7. As shown, the upper terminals of the left-hand keys are commonly connected to one terminal of a battery B and the upper terminals of the right-hand keys are commonly connected to the other battery terminal. Therefore, it should be apparent that the simultaneous depression of one key of the left-hand group and one key of the right-hand groups can energize solenoids S as discussed below.

As shown, the conductors from the left-hand contacts are connected to the Y or column input circuits, and the seven conductors of the right hand are connected to the X or row input circuits of the matrix. The matrix is shown as including in one embodiment of the typewriter 49 solenoids which in actuality are mechanically linked to the typewriter functions. Although these solenoids are schematically shown in electrical circuits with diodes of the character selector circuit, it should be realized that all may be physically confined within the typewriter. The solenoids correspond to the 49 keys or mechanisms necessary to operate the keys and controls on a conventional electric typewriter in accordance with the dual-input man/machine language or EPSILONTAU chart shown in FIG. 1. For convenience these solenoid coils designated as S are shown as being arranged in seven horizontal rows and seven vertical columns. Connected to the upper terminal of each solenoid Coil S is a diode D poled to permit current flow in one direction through the solenoid coil and block current flow in the opposite direction. The lower ends of the coils in each row are connected in common through a conductor to one of the X or row inputs. The X or row inputs are connected respectively through one of the switches in the right-hand row bank to the positive pole of the battery B. The upper or cathode terminals of all diodes in any respective column are connected via a common conductor through the corresponding switch in the left-hand column bank of switches to the negative side of the battery.

Further reference may be made to my U.S. Pat. No. 3,507,376 for more detailed explanations and other embodiments. However, as described above, the depression of switch No. 2 in the row bank and switch No. 3 in the column bank will provide for energization of Coil S-H, thus typing the letter H or displaying or recording same.

SEVEN-KEY INTERFACE SYSTEM

Figure 3:
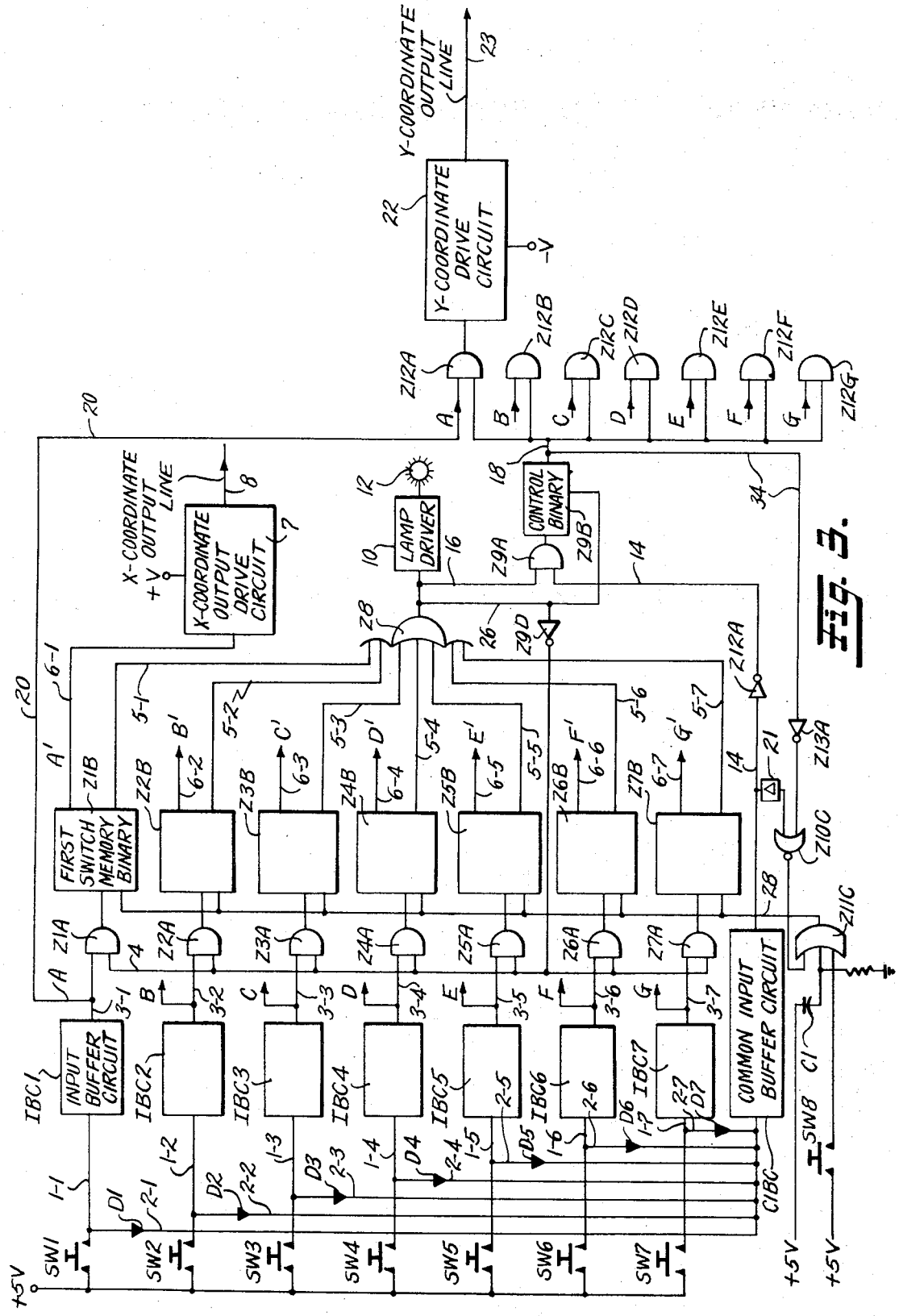
FIG. 3 is a schematic diagram of a seven-key input interface.

Reference is now made to FIG. 3 wherein there are illustrated seven interface coding switching means or transducers SW1-SW7. Energization of each switch feeds a signal over lines 1-1 to 1-7 into respective input buffer circuits ICB1-ICB7. Likewise, the energization of any of the switches SW1-SW7 also connects the potential to a common input buffer CIBC through a plurality of lines 2-1 to 2-7 and diodes D—D7. As will be seen below, CIBC changes state prior to ICB1-ICB7 on actuation of the switch and reverts to the static state after ICB1-ICB7 on switch release. The outputs from the input buffer circuits ICB1-ICB7 are fed over lines 3-1 to 3-7 to respective X-coordinate input drive gates Z1A through Z7A. It will be noted that lines 3-1 through 3-7 are connected to one of the terminals of the input AND gates Z1A-Z7A. The other terminal of the input AND gate is connected by a common line 4 as will be discussed below. The output of each input gate Z1A through Z7A is connected to one of the inputs of a respective number of first switch memory binaries Z1B through Z7B. One output, 5-1 through 5-7, from each of the first switch memory binaries Z1B through Z7B is connected to a logic element Z8. The logic element Z8 changes state the instant a first bit representing a first switch actuation is loaded in one of the memories Z1B–Z7B. Each of the memories Z1B–Z7B have a second output 6-1 through 6-7 (also labeled A'–G') connected to a respective X-coordinate output drive circuit 7 (only one of which is seen). The drive circuits are in turn directly connected to X-coordinate output lines, one of which is seen at 8.

One output from ligic element Z8 is connected to a lamp driver circuit 10 which will illuminate a first bit indicator 12 which may be placed adjacent the interface panel to provide the operator with feedback to the effect that the first bit has been accepted and is stored in the memory. The output of element Z8 is also connected via a line 26 to line 4 through an inverter Z9D which in turn is connected to the second of the input terminals of drive gates Z1A–Z7A, closing them. Line 26 is also connected to control binary Z9B.

When any one of the switches SW1–SW7 is released, an output from the common input buffer circuit CIBC places a signal on line 14 through an inverter Z12A to a logic AND gate element Z9A. There will also be an output from logic element Z8 over line 16 into AND gate Z9A. When the switch is released, therefore, there will be outputs over lines 14 and 16, thus gating logic element Z9A "on," which in turn will gate "on" a control binary labeled Z9B. The output of the control binary Z9B will be fed over a line 18 to one terminal of a plurality of Y-coordinate driver gates Z12A–Z12G. The other input terminal of each of the logic elements Z12A–Z12G will be connected to respective output lines A–G of the input buffer circuit, one of which is seen as line 20. Each of the Y-coordinate drive gates when gated "on" will transmit a signal to the appropriate Y-coordinate driver circuit, one of which is seen at 22. The output of the Y-coordinate driver circuit is connected directly to a Y-coordinate output line 23.

As will be discussed more fully below in the "OPERATION" section, it will be seen that actuation of the second switch of the sequential pair produces an output from its associated input buffer circuit IBC1–IBC7 which is transmitted to the appropriate Y-coordinate output driver circuit (for example 22) through the enabled drive Y-coordinate driver gate Z12A–Z12G.

The X and Y coordinate output lines may be connected to matrix 30 such as that shown in my previous U.S. Pat. No. 3,507,376. Thus, a dual-sequential input is converted to a dual-concurrent output. Alternatively, outputs 8 and 23 may be connected to a code converter, such as an ASCII code converter, and a solenoid driver—or some other logic conversion system—to operate a typewriter, such as the IBM "SELECTRIC" brand typewriter.

Upon release of the second switch of the sequentially operated pair, the transition of the output from CIBC to its static state is differentiated by the network 22 at the input of logic element Z10C. The other terminal of Z10C is connected to the output of control binary Z9B via line 34 through an inverter Z13A. The pulse output from Z10C is connected to one of the terminals of logic OR element Z11C. The output from Z11C resets the first switch memory binaries Z1B–Z7B. With the first binaries reset, Z8 reverts to its initial static state, and the "first-bit" light 12 is extinguished. Also, the static state of Z8 through line 26 is used to reset the control binary Z9B. Thus, the controller is ready to accept another dual-sequential input.

Also, the binaries Z1B–Z7B, and thus the control binary Z9B, are initially reset when the device is turned "on" through element Z11C via line 28. This is accomplished from the +5 volt potential which is delayed through the charging action of C1.

Also, the first switch memory binaries can be reset through Z11C upon actuation of SW8 in the event the operator recognizes that his first input switch selection was an error.

OPERATION OF THE SEVEN-KEY INTERFACE SYSTEM

For ease in explanation it is assumed that the operator presses switch SW1 for his first sequential pair energization, which will provide the X-coordinate, and then also presses SW1 to provide the Y-coordinate. The present system operates in real-time, and features direct memory access.

When the device is turned "on" the binaries Z1B–Z7B are initially reset through element Z11C. The closing of switch SW1 will feed the signal into input buffer circuit IBC1 over line 1-1. The output from input buffer circuit IBC1 will go over the line 3-1 into the X-coordinate drive input gate Z1A at its first terminal. The signal will also appear on the common input buffer circuit CIBC over line 2-1 through D1.

Now assuming that the drive gate Z1A is enabled by the signal coming over line 4, the signal from SW1 will be impressed upon the first switch memory binary Z1B. The signal will be generated over line 5-1 to logic element Z8 which will change its state the instant the bit of information is loaded into memory binary Z1B.

The output from Z8 over line 26 through element Z9D will then gate "off" various elements Z1A–Z7A. The Z8 output, which is also connected to the lamp driver 10, will illuminate the "first bit" indicator 12 to advise the operator that the X-coordinate has been established.

The establishment of the X-coordinate is accomplished by the transmission of a signal over line 6-1 (also labeled A') to the X-coordinate output drive circuit 7 and then on to the X-coordinate output line 8.

Upon release of the switch SW1 an output signal from the common input buffer circuit CIBC places an input signal over line 14 to one terminal of the logic element Z9A. The other terminal of element Z9A is energized via line 16 from logic element Z8. Therefore, when the switch is released there will be outputs over lines 14 and 16, thus gating logic element Z9A "on." Because of the timing relationship between the output of ICB1 and CIBC, the switching "on" of Z9A is assured of occurring after ICB1. This in turn will latch the control binary Z9B. Since the output of control binary Z9B is connected to one of the terminals of logic elements Z12A-Z12G, one terminal will be gated "on" for each of the elements which are the Y-coordinate drive gates. When the switch is depressed for the second time (again assuming it is the switch SW1), the signal will follow over lines 1-1 to the input buffer circuit IBC1 and line 3-1 to line 20 (also labeled A). Since the Y-coordinate drive gates have been enabled via line 18, the output from line 20 will thus gate on the logic element Z12A. This in turn will energize the Y-coordinate driver circuit 22 and provide an output on the Y-coordinate output line 23.

Now upon release of the second switch the reversion to the initial static state of the output over line 14 from the common input buffer circuit CIBC will be differentiated by element 22 and energize logic gate Z10C, which has been enabled by the control binary Z9B. This signal is utilized to clear the memory binaries Z1B–Z7B through logic element Z11C, which will output a reset signal to the memory binaries over line 28.

With the first switch binaries reset, Z8 reverts to its initial static state, and the "first bit" light 12 is extinguished. Also, the static state of Z8 through line 26 is used to reset the control binary Z9B.

Reset switch SW8 can also be used in conjunction with logic element Z11C to reset the first switch memory binaries Z1B–Z7B when an error is made in actuation of the first switch.

The output from X- and Y-coordinate lines 8 and 23 are connected to matrix 30 or code converter 32 for energization of the approximate letter on a typewriter, for example.

The hard wire control system of invention is thus seen to utilize direct access to the memory, and to operate in real-time. It is to be understood that the number of input switches can be varied in the system, according to a formula whereby the number of resultant signals is equal to $S^n$, wherein S is the number of input switches and n is the number of successive sequential actuations.

SINGLE INPUT "HOLD" INTERFACE SYSTEM

Figure 4:
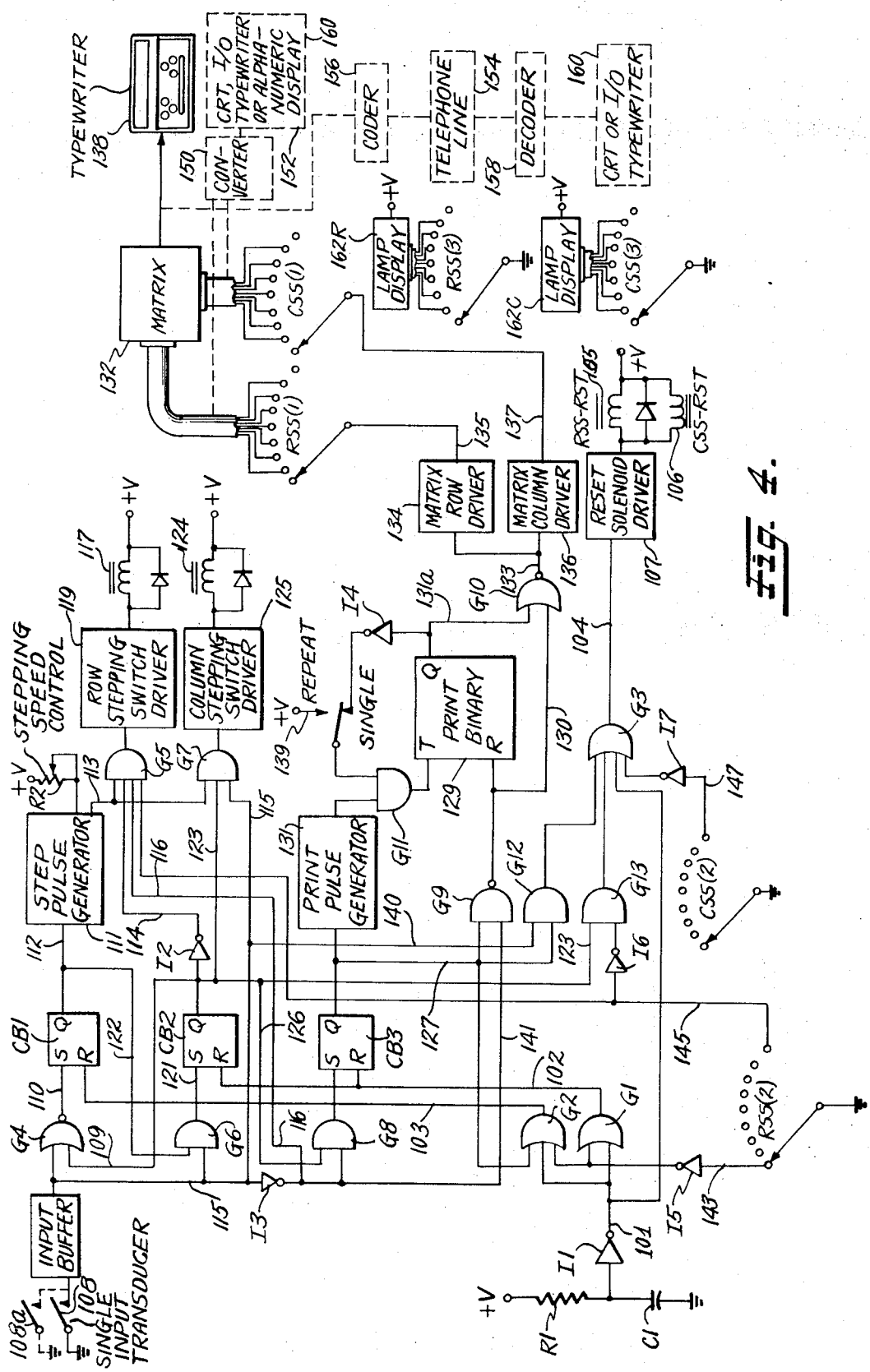
FIGS. 4, 5 and 5a are schematic diagrams of the system, utilizing a single input transducer interface.

The system illustrated in FIG. 4 of the drawing is an apparatus deisgned to operate in real-time. Essentially, it is a hard-wire device, except for the transducer which may be a photocell, reactive coupling, etc. As shown, when the system is turned on, the charging action of a capacitor C1 through a resistor R1 serves to maintain the output of an inverter I1 high for a short period. The high output signal from the inverter I1 resets a plurality of control binaries CB1, CB2, and CB3. The control binaries CB2 and CB3 are reset from inverter I1, via a line 101, an OR gate G1 and a line 102. The control binary CB1 is reset from inverter I1, via line 101, an OR gate G2 and a line 103. Also when the power is turned "on," the momentarily high output of inverter I1 is connected to the reset coil of a row stepping switch 105, and the reset coil of a column stepping switch 106, via line 101, and OR gate G3, a line 104, and a reset solenoid driver 107, thus resetting a plurality of selective directing means in the form of a pair of mechanically-ganged switchbanks to their zero positions. The ganged switches are designated as RSS(1-3) and CSS(1-3).

A single-input interface transducer or switching means shown in the form of a single-pole, single-throw, normally-open switch 108 has its movable contact connected to ground. Obviously, the switch could be of the reactive type or of a type which can be actuated by a slight movement of a muscle. Also, it could be an inertialess switch such as a photoelectric device which responds to an interruption of a light beam, to the movement of the eyeball, blinking of the eyelid, movment of a controllable portion or portions of the body, operable from control signals generated by muscles or signals of the central nervous system of the human controller. Further, the input transducer may be operable by other signals from the human controller, such as controllable acoustic signals, temperature, odor, etc. Additionally, one or more switches 108a may be included in parallel whereby the operator can continue to communicate if one portion of the body tires.

Actuation of the switch 108 will set control binary CB1 through a NOR gate G4, and via a line 110. The other input of gate G4 is connected to the output of CB2 (which is in the reset state) via a line 109.

The output of CB1 is connected to the control input of a step-pulse generator 111 via a line 112, the output of which (while CB1 is set) is a series of pulses, and the rate of which is controlled by the setting of stepping speed control R2. The stepping pulses are fed to one input of an AND gate G5 via a line 113. A second of the other inputs of gate G5 is connected to the output of CB2 through the inverter I2 and a line 114. A third input is connected to the stationary contact of the single input switch 108 via a line 114, an inverter I3, and a line 116. The fourth input on the AND gate G5 is connected to the eighth position of the second bank of row stepping switches labeled RSS(2). The output of gate G5 is connected to the stepping solenoid of a row stepping switch 116 through row stepping switch driver 119. As long as the single input switch 108 is held actuated, the row stepping switch will step progressively through its range at a rate determined by a setting of a stepping speed control illustrated as a variable resistance R2.

Upon deactuation of switch 108, control binary CB2 will be set by the output of an AND gate G6, via a line 121. The inputs of gate G6 are connected to the output of CB1 via a line 122 and to the switch 108 via line 115. The output of CB2 closes gate G5 through inverter I2 and line 114, thus stopping the stepping action of the row stepping switch 117. Also, the output of CB2, via a line 123 is connected to an input of an AND gate G7. Th other inputs of the AND gate are connected to the step-pulse generator 111 via line 113, and the stationary contact of the switch 108 via line 115. Thus, deactuation of the single input switch 108, following its actuation, allows a stepping solenoid 124 of a column stepping switch to be driven by the step pulse generator 111 via line 113, gate G7, and a column switch driver 125. As long as the switch 108 remains unactuated (after its initial actuation), the column stepping switch CSS will step progressively through its range at a rate determined by the stepping speed control setting on R2.

When the single input switch 108 is actuated for the second time, control binary CB3 will be set from an output of an AND gate G8. The inputs of the gate G8 are connected to the output of CB2 via line 126 and the stationary contact of switch 108 via line 115 and inverter I3. Control bianry CB1 is reset by the output of CB3, via a line 127, the gate G2 and line 103. With CB1 in the reset state, the step-pulse generator 111 is disabled via the signal on line 112. The output of CB3 also starts a print pulse generator 131, the output of which is a series of pulses at a fixed repetition rate. Also, the output of NAND gate G9, with inputs from CB3 via line 127 and from the switch 108 via line 115 and I3 removes the reset signal from a print binary 129 and enables a NOR gate G10 via a line 130. The other input to gate G10 is from the output of the print binary 129 via a line 131a. The output of gate G10 is connected to the selected row of the matrix 132 via a line 133. a matrix row driver 134, a line 135, and the selected step of the first bank of the row stepping switch RSS(1). Also, the output of gate G10 connects the selected column of the matrix 132 via line 133, a matrix column driver 136, a line 137 and the selected step of the first bank of the column stepping switch CSS(1). The matrix 132 is in turn connected to a typewriter 138 in a known manner.

It will be understood that in place of the matrix 132, an ASCII code converter 150 or the like and a solenoid drive device can be used in connection with an input-/output typewriter 152 of the type sold by IBM under the trademark "SELECTRIC," or a CRT. Also, a telephone line 154 could be used with a coder 156 and decoder 158 to convey information to a CRT, I/O typewriter lamp, or alpha-numeric display 160.

It is further contemplated that the output could be connected through known means to a drum or other recorded means whereby an audible output could be generated for feed.

When a switch 139 having "single" and "repeat" positions is in the "single" position, the output of the print binary 129 is connected to an input of an AND gate G11 via an inverter I4, and the switch 139. This arrangement allows the first pulse output of the print pulse generator 131 to set the print binary 129, closing gate G10 via line 131a. This will remove the input drive signal via line 133 to the matrix row and column drivers 134 and 136, thus causing cessation of the row and column matrix drive signals. Also, the output of the print binary via inverter I4 and switch 139 closes gate G11, preventing subsequent changes in the state of the print binary 129 as a result of the output pulses from the print pulse generator 131. Thus, with the switch 139 in the "single" position, one and only one output drive signal is provided from the controller to the matrix 132.

With the switch 139 in the "repeat" position, the output of the print binary 129 is prevented from closing gate G11, allowing the print binary 129 to change state with every pulse from the print oscillator 131. Thus, a repetitive, square-wave drive signal is provided to the matrix row and column drivers 134 and 136 for as long as the single input switch 108 is held actuated.

When the single input switch 108 is released, a signal is transmitted via lines 115 and 140 to one input of an AND gate G12, the other input of which is connected to the output of CB3 via line 127. The output of gate G12 provides a drive signal to the stepping switch reset solenoids 105 and 106 through gate G3 over line 104, and the reset solenoid driver 107. This causes both stepping switches to reset to their zero positions. Also, the signal from switch 108, via line 115, inverter I3 and line 141 closes gate G9, in turn closing gate G10 via line 130. This causes a cessation of the matrix drive signals and resets the print binary 129.

When the row stepping switch returns to the zero position, control binary CB2 and CB3 are reset from the zero position of row stepping switch RSS(2), a line 143, an inverter I5, gate G1 and line 102. The gate G12 is closed by the output of CB3 via line 127, thus removing the drive signal from the two stepping switch reset solenoids 105 and 106. With both stepping switches at their zero positions the three binaries CB1, CB2, and CB3 reset, and the print binary 129 also reset, the controller is in its initial state ready to receive another set of sequential inputs via the single input switch 108.

If the row stepping switch RSS is allowed to drive to postion 8, gate G5 will be closed by the signal from postion 8 of bank 2 of the row stepping switch RSS(2), via a line 145, stopping the stepping action of RSS. Release of the switch 108 will set CB2 as before, but the output of CB2, via line 123 to an input of an AND gate G13 will produce a drive signal to the two stepping switch reset solenoids 105 and 106 via a line 147, gate G3, line 104, and the reset solenoid driver 107. The other input to G13 is connected to line 145, through inverter I6. Thus, the row and column stepping switches RSS and CSS will be reset to their zero positions. The control binary CB2 will be reset and the drive signal to the reset solenoid of the stepping switches will be caused to cease as before. Also, control binary CB1 will be reset by RSS(2) reaching the zero position, via line 143, inverter I5, gate G2, and line 103. The controller is thus reset and ready to receive another set of sequential inputs.

If the column stepping switch CSS is allowed to drive to position 8, a stepping switch reset pulse will be produced at the output of gate G3 as a result of the connection between position 8 of the second bank of the column stepping switch CSS(2) and an input of gate G3 via a line 147 and inverter I7. The stepping switches and the control binaries will be reset as before and the controller will be ready to accept another set of sequential inputs.

The third bank of the two stepping switches, RSS(3) and CSS(3) are available for controlling a pair of lamp displays 162R and 162C in order to provide feedback to the operator related to the positions of the two stepping switches in order to facilitate controller operation. The lamp display could also be a single bank of lights with a matrix input, thereby giving a display of the function types. It will be appreciated that an acoustical and/or palpaple vibration means could be used instead of or together with the lamp display.

It should be noted that this chart is used in conjunction with the dual-input programming code as used for a 14-input interface as described in my aforementioned patent. Thus, a person who has become weakened and has only a unilateral control capability need not learn a new code. Of course, the position of the letters and symbols can be re-arranged to suit an individual's need.

OPERATION OF THE "HOLD" SYSTEM

The operation of the system of FIG. 4 just described will be seen briefly as it relates to the typing of a letter, for example, the letter H. It is necessary to proceed two steps up the outside of the matrix to the second row, and then three steps along the matrix to the third column. Therefore, upon actuation of the transducer or switch 108, the control binary CB1 will be set through NOR gate G4 via line 110. The output of CB1 will then be connected to the step-pulse generator 111 via line 112. The speed of the output pulses of the generator is controlled by R2. The stepping pulses are then fed into the AND gate G5 via line 113. The output of G5, being connected to the row stepping switch driver 119 and the stepping solenoid of the row stepping switch 117, will connect the stream of pulses from generator 111 to the solenoid, thus driving the bank of row switches RSS(1-3). Switch 108 is held down a time sufficient to drive the RSS to the position two in RSS(1), i.e., to the second row. Upon deactuation of the single switch input 108, the row stepping switch will stop. Therefore, by driving the switch 117 two steps, the desired row for typing an H will be reached.

Also, upon deactuation of switch 108, control binary CB2 will be set by the output of the AND gate G6 via line 121. The output of CB2, through inverter I2 and line 114 closes gate G5, thus stopping the stepping action of the row stepping solenoid 117 at the appropriate row in the matrix. The output of CB2 is also connected to the AND gate G7, as is output line 113 from the step-pulse converter 111, together with line 115 from the stationary contact of the signal input switch 108. Therefore, as long as switch 108 remains deactuated, the column stepping switch will step progressively through its range at the rate at which pulses are received from the step-pulse generator 111.

When the desired column is reached, i.e., when the column stepping switch solenoid 124 has driven CSS(1) to the third column, switch 8 is again actuated. In the instant example, this will means that CSS(1) is at position three.

As explained in detail above, when the switch 108 is actuated for the second time, control binary CB3 will be set and CB1 reset, thus disabling the step-pulse generator 111 via the signal on line 112. The output from CB3 will start the print pulse generator 131, the output of which is a series of pulses at a fixed repetition rate. Also, the output of NAND gate G9 removes the reset signal from the binary 129 and enables the NOR gate G10. The output of gate G10 is connected to the selected row of the matrix 132 via line 133, the matrix row driver 134, line 135 and the movable contact of the row stepping switch RSS(1). Further, the output of gate G10 connected the selected column of the matrix 132 via line 133, the matrix column driver 136, line 137 and the selected step of the column stepping switch CSS(1). Therefore, a signal will be generated over the line emanating from step two in RSS(1) and step three in CSS(1) to the matrix. This will actuate an element in the matrix, which in turn is connected to a typewriter as illustrated in my previous patent and previously filed application, both of which are referred to above. Finally, upon release of the switch 108 the controller will be reset to its initial state and a new letter may be typed.

SINGLE INPUT "NO-HOLD" INTERFACE SYSTEM

Figure 5:
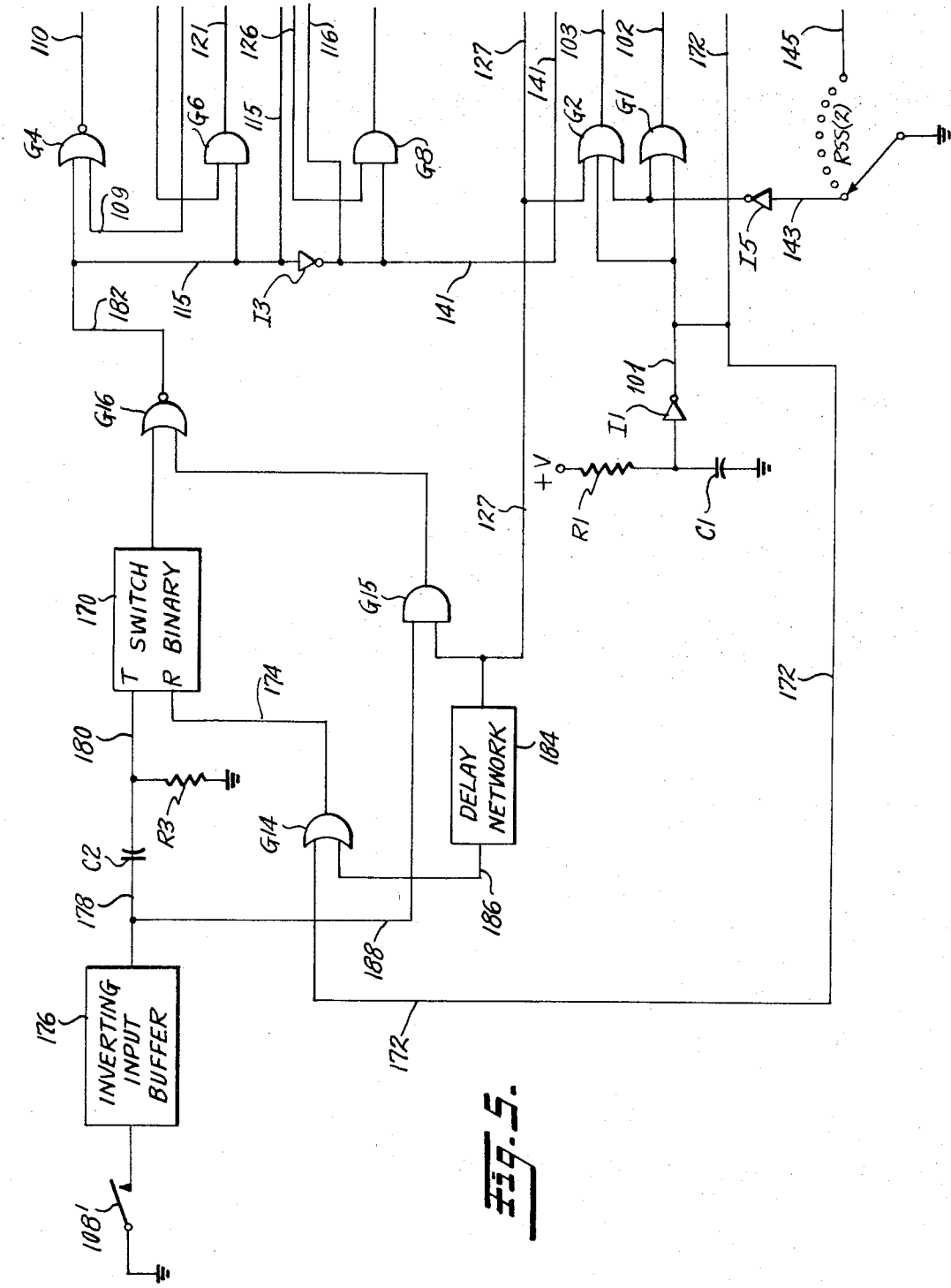
Figure 5A:
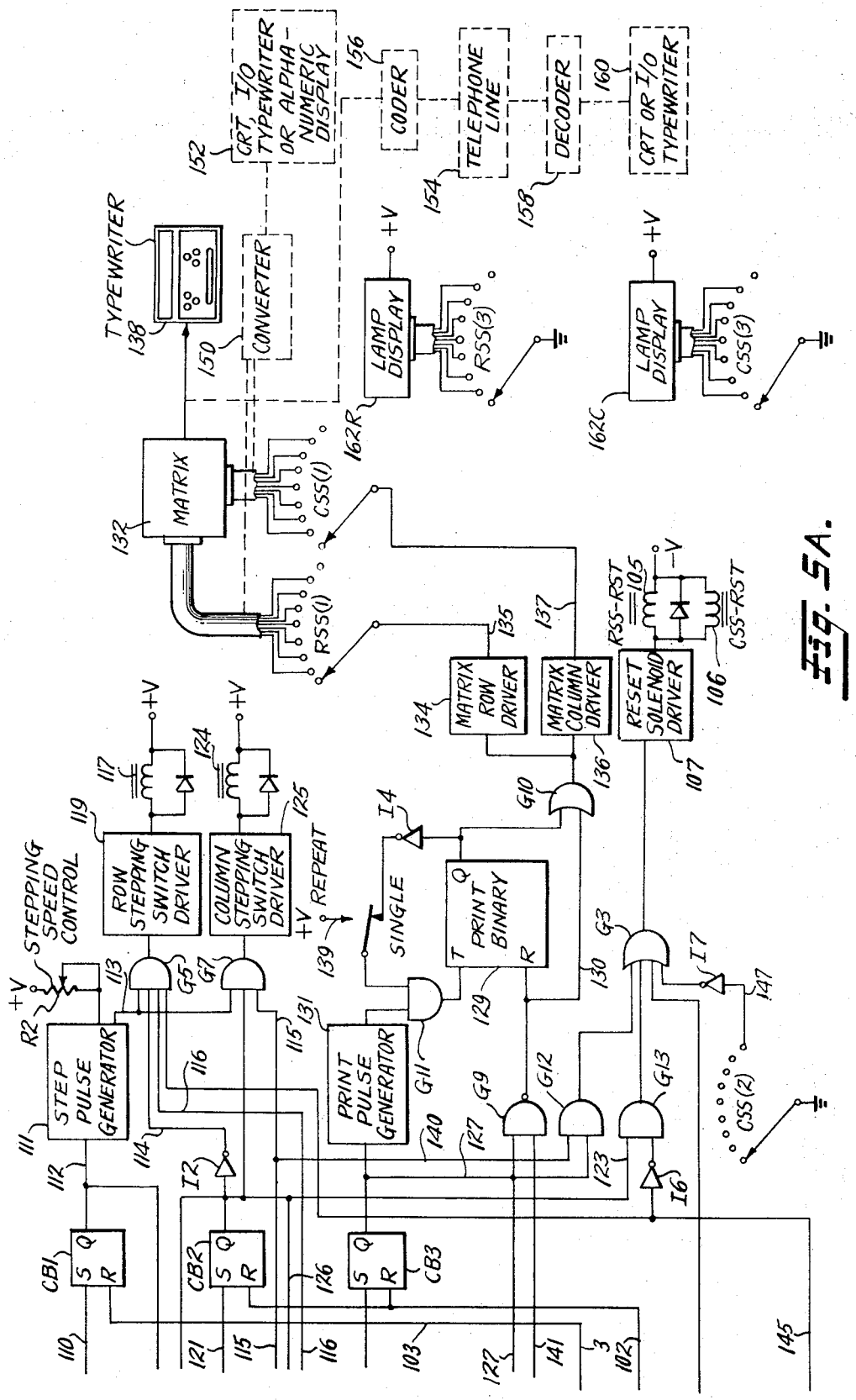

The system illustrated in FIG. 5 and FIG. 5A of the drawing is essentially similar to FIG. 4, with the exception of the input apparatus. When the power is turned on the charging action of capacitor C1 through resistor R2 serves to maintain the input of the inverter I1 low for a short period. Control binaries CB1, CB2 and CB3, as well as a switch binary 170, are reset during this period by the output of inverter I1. Control binary CB1 is reset from inverter I1, via line 101, and OR gate G2 and line 103, while control binary CB1 is reset via line 101, or gate G2 and line 103. The switch binary 170 is reset via line 101, a line 172, an OR gate G14, and a line 174. Also, at power turn-on, the momentarily high output of I1 is connected to the reset coils 105 and 106 of RSS-RST and CSS-RST via line 101, the OR gate G3, line 104, and the reset solenoid driver 107, thus resetting the three switch banks of each of the two stepping switches to their zero positions. It will be appreciated that in another embodiment of both the "No-Hold" and "Hold" embodiments solid state switching means could be employed rather than the illustrated mechanically gang stepping switches.

As in the preceding embodiment, a single-input, single-pole, single-throw, normally open switch 108' is illustrated as having a movable contact connected to ground and a fixed contact connected to an inverting input buffer 176. As above, it will be apparent that a pressureless or inertialess switch can be used, such as known photoelectric, capacitive, inductive, reactive devices or the like. Actuation of switch 108' will result in a positive going step at the output of the inverting buffer 176. The leading edge of this step on line 178 will be differentiated by the action of a capacitor C2 and a resistor R3. The differentiated signal is connected to the toggle input of the switch binary 170 via a line 180. Tus, the switch binary will change to the set state. The output of the switch binary 170 is connected to an input of the NOR gate G4 through another NOR gate G16 and a line 182. The other input to gate G4 is connected to the output of CB2 (which is in the reset state) via line 109. The output of gate G4 will thus set CB1 via line 110 when switch 108' is actuated for the first time.

The output of CB1 is connected to the control input of the step pulse generator 111 via line 112, the output of which (while CB1 is set) is a series of pulses, the rate of which being controlled by the setting of the stepping speed control R2. The stepping pulses are fed to one input of the AND gate G5 via line 113. One of the other inputs of gate G5 is connected to the output of CB2 through inverter I2 and via line 114. A third input to gate G5 is connected to the output of gate G16 through lines 182 and 115, inverter I3 and line 116. Finally, the last input of gate G5 is connected to the eighth position of the second bank of the row stepping switch RSS(2) via line 145. The output of gate G5 is connected to stepping solenoid 117 of the row stepping switch through the row stepping switch driver 119. The row stepping switch will continue to step progressively through its range at a rate determined by the preset setting of the stepping speed control R2 whether the switch 8 is held actuated or released.

When the switch 108 is actuated for the second time (after first having been deactuated), the switch binary 170 will be toggled as before, resulting in its being in the reset state. The reset state output signal from the switch binary is again connected to one input of gate G16. The other input of gate G16 is connected to the output of an AND gate G15. Since one of the inputs to gate G15 is connected to the output of CB3 (in the reset state) via line 127, the output of G16 will be controlled by the reset state of the switch binary 170. The control binary CB2 will be set by the output gate G16 via line 115 through AND gate G6 and via line 121. The other input of gate G6 is connected to the output of CB1 in the set state. The output of CB2, through inverter I2 and line 114 closes gate G5, thus stopping the stepping action of the row stepping switch. Also, the output of CB2 is connected to an input of AND gate G7. The other inputs of gate G7 are connected to the stepping pulse generator via line 113 and the output of G16, via lines 182 and 115. Thus, the second actuation of the single input switch 8' allows the stepping solenoid 124 of the column stepping switch CSS to be driven by the step-pulse generator 111, via line 113, gate G7, and the column switch driver 125. The column stepping switch will step progressively through its range at a rate determined by the setting of the stepping speed control R2, whether the switch 108' is held actuated or released.

When the single-input switch 108' is actuated for the third time (again, after first having been deactuated for the second time), the switch binary 170 will be toggled as before which results in its being in the set state. The doubly inverted set state output of the switch binary 170 is impressed on one input of the AND gate G8, via lines 182 and 115 and inverter I3. The other input of gate G8 is connected to the output of CB2 (in the set state) via line 126. The control binary CB3 will then be set by the output of gate G8.

The set state output of CB3 resets switch binary 170 via line 127, a dealy network 184 a line 186, gate G14 and line 174. The output of CB3 is also connected to an input of gate G15 via line 127. The other input of gate G15 is connected to the output of the inverting input buffer 176 via line 188. The output of gate G15 is connected to one input of G16. Thus, though the switch binary has been reset by the output of CB3, the state of the signal on line 116 will not change provided the switch 108' is held actuated. The purpose of the delay network 184 is to assure that the set state output of CB3 will be in control of the output state of gate G16 prior to the reset of the switch binary 170 by the same output of CB3. CB1 is reset by the output of CB3 via line 127, gate G2, and line 103. With CB1 in the reset state, the pulse generator 111 is disabled by the control signal on line 112 from CB1.

The output of CB3 starts the print pulse generator 131, the output of which is a series of pulses at a fixed repetition rate. Also, the output of the NAND gate G9, with inputs from CB3 via line 128 and from gate G16 via line 115, inverter I3 and line 141, removes the reset signal from the print binary 129 and enables a NOR gate G10 via line 130. The other input to the gate G10 is from the output of the print binary 129 via line 131a. The output of gate G10 is connected to the selected row of the matrix 132, through the matrix row driver 134, line 135, the selected step of the first bank of the row stepping switch RSS(1), and the seven-wire connection. Also, the output of gate G10 connects the selected column of the matrix 132, through matrix column driver 136, line 137, the selected step of the first bank of the column stepping switch CSS(1), and the seven-wire connection. The matrix 132 is in turn connected to a typewriter 138 via a multi-wire cable in a known manner. As stated above in regard to FIG. 4, the output of the matrix could be connected to a variety of other devices. Also, instead of the matrix the I/O type device can be connected through a code converter and solenoid drive system, as well as an audio output from a record having the alphabet and/or other functions recorded thereon.

With the switch 139 in the "single" position, the reset output of the print binary 129 enables an AND gate G11 through the inverter I4 and switch 139. This arrangement allows the first pulse output of the print pulse generator 131 to toggle the print binary 129 to the set state, closing gate G10 via line 131a, and removing the input drive signal via line 133 to the matrix row and column drivers 134 and 136, thus causing a cessation of the row and column matrix drive signals. Also, the output of the print binary through inverter I4 and switch 139 closes gate G11, preventing subsequent changes in the state of the print binary 129 as a result of the output pulses from the print pulse generator 131. Thus, with the switch 139 in the "single" position, one and only one output drive signal is provided from the controller to the matrix 132.

With the switch 139 in the "repeat" position, the gate G11 is continuously enabled through switch 139, allowing the print binary 129 to change state with every pulse from the print oscillator 131. Thus, a repetitive square-wave drive signal is provided to the selected row and column producing repetitive drive to the selected function for as long as the third actuation of switch 108' is held.

When the switch 108' is released (following the third actuation), the change in output state of the inverting input buffer 176 connected to one input of gate G16 (via line 188, gate G15) will, in conjunction with a reset state output signal of the switch binary 170 impressed on the other input of gate G16, result in a change in state of the output of gate G16. The output of gate G16 is transmitted via lines 182, 115 and 140 to one input of the AND gate G12. The other input of gate G12 is connected to the output of CB3 via line 127. The output of gate G12 provides a drive signal to the stepping switch reset solenoid 105 and 106, via gate G3, line 104 and the reset solenoid driver 107, causing both stepping switches to reset to their zero positions. Also, the signal from gate G16, via lines 182 and 115, inverter I3 and line 141 closes the gate G9, the output of which in turn closes gate G10 via line 130. Thus, the matrix drive signals cease. Further, the output of gate G9 resets the print binary 129.

When the row stepping switch returns to the zero position, control binary CB2 and CB3 are reset from the zero position contact of RSS(2), line 143, inverter I5, gate G1 and line 102. The gate G12 is closed by the reset output of CB3 via line 127, thus removing drive from the two stepping switch reset solenoids 105 and 106. With both stepping switches at their zero positions and the three control binaries, the print binary 129 and the switch binary 170 reset, the controller is in its initial state ready to receive another set of three sequential inputs via input switch 108'.

If the row stepping switch RSS is allowed to drive to position 8, gate G5 will be closed by the signal from position 8 of the second bank of the row stepping switch RSS(2), via line 145, stopping the stepping action of RSS. A second actuation of switch 108' under this condition will set CB2 as before, but the output of CB2 via line 109 to an input of AND gate G13 in conjunction with a signal to the other input from position 8 of RSS(2) via line 145 and inverter I6, will produce a drive signal to the two stepping switch reset solenoids 105 and 106 through gate G3 and the reset solenoid driver 107. Thus, the row and column stepping switches RSS and CSS are reset to their zero positions. The control binary CB2 will be reset and the drive signal to the reset solenoids of the stepping switches caused to cease as before. Also, control binary CB1 will be reset by RSS(2) reaching the zero position, via line 143, inverter I5, gate G2 and line 103. The controller is thus reset and ready to receive another set of three sequential inputs via the single input switch 108.

If the column stepping switch CSS is allowed to drive to position 8, a stepping switch reset pulse will be produced at the output of gate G3 as a result of the connection between position 8 of the second bank of the column stepping switch CSS(2) and an input of gate G3 via line 147 and inverter I7. The stepping switches in the control binaries will be reset as before and the controller will be ready to accept another set of sequential inputs.

As above, the third bank of the two stepping switches, RSS(3) and CSS(3) are available for controlling a lamp display to provide feedback to the operator related to the positions of the two stepping switches to facilitate controller operation. Also, as above, it will be appreciated that an acoustical and/or palpable vibration means can be used instead of, or together with, the lamp display.

OPERATION OF THE "NO-HOLD" EMBODIMENT

The operation of FIG. 5 and FIG. 5A just described will be seen briefly as it relates to the typing of a letter, for examplle, the letter H. As was discussed above, it is necessary to proceed two steps up the outside of the matrix to the second row, and then three steps along the matirx to the third column. Therefore, upon a first actuation of the transducer 108, a positive going step will result at the output of the inverting buffer 176. A signal will then be fed after differentiation into the switch binary 170 thus changing it to its set state. The signal passing through NOR gates G16 and G4 will set CB1. The output of CB1 controls the step pulse generator 111 which feeds a series of stepping pulses through gate G5 and the row stepping switch driver 119 to the stepping solenoid of the row stepping switch 117. The row stepping switch will continue to step progressively through its range at a rate determined by the speed control setting, whether or not the switch 108' is held actuated or released.

Upon a second actuation of switch 108', the switch binary 170 will again be toggled. The output of gate G16 will set control binary CB2 via gate G6. The output of CB2, through inverter I2 will close gate G5, thus stopping the stepping action of the row stepping switch.

Therefore, an initial actuation of the switch will start the row stepping switch moving up the matrix. When it reaches the desired row, a second actuation will stop the row stepping switch movement. However, since the output of CB2 is also connected to the input of gate G7 (another input of whch is connected to the step pulse generator 111), the column stepping switch CSS will start stepping due to the signal through gate G7 and column stepping switch driver 125 to the solenoid 124. In this instance as well as above, the column stepping switch will step progressively through its range whether the switch 8' is held actuated or released.

When switch 108' is actuated for the third time, the switch binary 170 will again be toggled. Since the output of gate G16 is also connected to the input of gate G8 through line 115 and inverter I3, CB3 will be set via the output of gate G8. The set state of CB3 then resets the switch binary 170 through line 127, through the delay network and OR gate G14. The output of CB3 is also connected to gate G15 which in turn is connected to an input of gate G16. Thus, though the switch binary has been reset by the output of CB3, the state of the signal on line 115 will not change provided that the switch 108' is held actuated. As stated above, the purpose of the delay line 184 is to insure that the set state of output CB3 will be in control of the output state of gate G16 prior to the reset of the switch binary 170 by the same output of CB3. Since CB1 will be reset by the output of CB3, line 127, gate G2 and line 103, the step-pulse generator 111 is disabled via the control signal from CB1.

Therefore, upon the third actuation of switch 108, the column stepping switch is stopped, and in the instant example, this will be after it has stepped to the third column. Thus, the row stepping switch RSS(1) is at the second contact and the column stepping switch CSS(1) is at the third contact.

The output of CB3 is also connected to the input of gate G9, which in turn controls the print binary 129. At the same time the output from CB3, connected to the print pulse generator 131, starts sending a series of pulses through gate G11 to the print binary 129. The output of the print binary being connected to gate G10, as is the output of gate G9, via 130, will send signals to the selected points in the matrix via the matrix row driver 134 and the matrix column driver 136. This in turn will actuate the appropriate element in the matrix, which in turn will type the H on the typewriter.

Finally, the controller will be reset to its initial state and a new letter may be typed.

There are other embodiments which fall within the scope of the invention which would be obvious to one skilled in the art, depending upon the needs of the individual operator. An example would be a system which provided an operation as follows:

1. Upon a first actuation of the input switch, RSS would begin to step, stopping at the first position. It would be necessary for a second actuation of the input switch to step RSS to the second position; a third actuation, to a third position, etc.

2. Upon completion of the above actuations, CSS will begin stepping, and continue to step until the desired column is reached.

3. When the desired column is reached, the input switch is actuated a final time. CSS will then stop, the "print" signals will be generated, and the solenoids reset.

While specific forms of the invention have been described herein, it is to be understood that the same is merely illustrative of the principles involved and that other forms may be resorted to within the scope of the appended claims.

For example, while the invention has been primarily described with respect to the progressively disabled person, it must be understood that the present method is equally applicable to the patient who progressively improves, or who, as some do, moves between improved and weakened abilities. In all these instances the common code greatly facilitates the ability to change from one interface to another. Thus, the present method provides comprehensive and easily learned communication ability to the handicapped, in all stages and degrees of their disability.

I claim:

1. A method of communication for and/or testing of a handicapped individual comprising:
    a. establishing for every function in a multiplicity of functions a unique combination of designators,
    b. providing means for producing each of said functions,
    c. connecting conducting means to said producing means for transmitting electrical signals commensurate with said unique combination, and
    d. selectively connecting to said conducting means each of the following:
        1. a first device having at least two sets of first input transducer means, each set having at least three first transducers, connecting each of said first transducers to said conducting means in a selective manner whereby upon the energization of a combination of a transducer from both of said sets, a dual output signal over a given pair of conducting means will produce a function,
        2. a second device having one set of second transducers equal in number to the number of transducers in one of said sets, connecting each of said second transducers to said conducting means in the same manner as the correspondingly located transducer in each of said two sets, whereby upon first energizing any transducer, a first signal of the dual output commensurate with the energization of a correspondingly located transducer in one of said two sets will be enabled to be connected to said conducting means, and upon another energization of any transducer a second signal of the dual output commensurate with the energization of a correspondingly located transducer in the other of said two sets will be connected to said conducting means, thereby producing the same function as if the first device were operated using the correspondingly located transducers in each of said two sets, 3. a third device having a single input transducer, connecting said single input transducer to said conducting means through a pair of counting means, each of said counting means having output contacts equal in number to the number of transducers in each of said sets of said first device, connecting each of said output contacts to said conducting means in the same manner as the correspondingly located transducer in each of said two sets, whereby upon an energization of said single input transducer a fisrt of said counting means will enable a first signal of the dual output commensurate with the energization of a correspondingly located transducer of one of said two sets to be connected to said conducting means, and upon another energization of said single input transducer the second of said counting means will enable a second signal of the dual output commensurate with the energization of a correspondingly located transducer of the other of said two sets to be connected to said conducting means, thereby producing the same function as if the first device were operated using the correspondingly located transducers in each of said two sets.

2. A method as defined in claim 1 wherein said function is a letter and said multiplicity of functions is an alphabet.

3. A method as defined in claim 2 wherein said producing means is a typewriter.

4. A method as defined in claim 1 wherein said producing means is a visual display.

5. A method as defined in claim 1 wherein said producing means is an audibly reproducable medium.

6. A method as defined in claim 1 wherein said conducting means includes a matrix.

7. A method as defined in claim 1 wherein said unique combination includes only two designators for each function.

8. A method as defined in claim 1 wherein including assigning each function is assigned a unique combination of designators substantially in accordance with the statistical occurrence of usage in the multiplicity of functions.

9. A method of communication for the increasingly debilitated, partially paralyzed patient comprising:
 a. establishing for every function in a multiplicity of functions a unique combination of designators;
 b. providing energizing means for producing each of said functions;
 c. connecting conducting means to said producing means for transmitting electrical signals commensurate with said unique combination;
 d. first, connecting to said conducting means a first device having at least two sets of first input transducer means, each set having at least three first transducers, connecting each of said first transducers to said conducting means in a selective manner whereby upon the energization of a combination of a transducer from both of said sets, a dual output signal over a given pair of conducting means will operate a corresponding function,
 e. secondly, upon the weakening of the patient, disconnecting said first device and connecting to said conducting means a second device having one set of second transducers equal in number to the number of transducers in one of said sets, connecting each of said second transducers to said conducting means in the same manner as the correspondingly located transducer in each of said two sets, whereby upon first energizing any transducer, a first signal of the dual output commensurate with the energization of a correspondingly located transducer in one of said two sets will be enabled to be connected to said conducting means, and upon another energization of any transducer a second signal of the dual output commensurate with the energization of a correspondingly located switch in the other of said two sets will be enabled to be connected to said conducting means, thereby producing the same function as if the first device were operated using the correspondingly located transducers in each of said two sets;
 f. thirdly, upon further weakening of the patient, disconnecting said second device and connecting to said conducting means a third device having a single input transducer connecting said single input transducer to said conducting means through a pair of counting means, each of said counting means having output contacts equal in number to the number of transducers in each of said sets of said first device, connecting each of said output contacts to said conducting means in the same manner as the correspondingly located transducer in each of said two sets, whereby upon an energization of said single input transducer a first of said counting means will enable a first signal of the dual output commensurate with the energization of a correspondingly located transducer of one of said two sets to be connected to said conducting means, and upon another energization of said single input transducer the second of said counting means will enable a second signal of the dual output commensurate with the energization of a correspondingly located transducer of the other of said two sets to be connected to said conducting means, thereby producing the same function as if the first device were operated using the correspondingly located transducers in each of said two sets.

10. A man-machine communication system comprising:
 a. means for retaining for every function in a multiplicity of functions a unique combination of designators,
 b. means for producing each of said functions,
 c. means for connecting conducting means to said producing means for transmitting electrical signals commensurate with said unique combination,
 d. the following devices each being selectively connected to said conducting means:
 1. a first device having at least two sets of first input transducer means, each set having at least three first transducers, each of said first transducers being connected to said conducting means in a selective manner whereby upon the energization of a combination of a transducer from both of said sets, a dual output signal over a given pair of conducting means will produce a function, 2. a second device having one set of second transducers equal in number to the number of transducers in one of said sets, each of said second transducers being connected to said conducting means in the same manner as the correspondingly located transducer in each of said two sets, whereby upon first energizing any transducer, a first signal of the dual output commensurate with the energization of a correspondingly located transducer in one of said two sets will be enabled to be connected to said conducting means, and upon another energization of any transducer a second signal of the dual output commensurate with the energization of a correspondingly located transducer in the other of said two sets will be connected to said conducting means, thereby producing the same function as if the first device were operated using the correspondingly located transducers in each of said two sets, 3. a third device having a single input transducer, said single input transducer being connected to said conducting means through a pair of counting means, each of said counting means having output contacts equal in number to the number of transducers in each of said sets of said first device, each of said output contacts being connected to said conducting means in the same manner as the correspondingly located transducer in each of said two sets, whereby upon an energization of said single input transducer a first of said counting means will enable a first signal of the dual output commensurate with the energization of a correspondingly located transducer of one of said two sets to be connected to said conducting means, and upon another energization of said single input transducer the second of said counting means will enable a second signal of the dual output commensurate with the energization of a correspondingly located transducer of the other of said two sets to be connected to said conducting means, thereby producing the same function as if the first device were operated using the correspondingly located transducers in each of said two sets.

11. A system as defined in claim 10 wherein said function is a letter and said multiplicity of functions is an alphabet.

12. A system as defined in claim 11 wherein said producing means is a typewriter.

13. A system as defined in claim 10 wherein said producing means is a visual display.

14. A system as defined in claim 10 wherein said producing means is an audibly reproducable medium.

15. A system as defined in claim 10 wherein said conducting means includes a matrix.

16. A system as defined in claim 10 wherein said unique combination includes only two designators for each function.

* * * * *